(12) United States Patent
Lutz et al.

(10) Patent No.: US 7,935,177 B2
(45) Date of Patent: May 3, 2011

(54) METHOD OF PURIFYING A GAS STREAM CONTAMINATED BY CO₂ AND ONE OR MORE HYDROCARBONS AND/OR NITROGEN OXIDES BY ADSORPTION ON AN AGGREGATED ZEOLITIC ADSORBENT

(75) Inventors: Cecile Lutz, Pau (FR); Paul-Guillaume Schmitt, Asnieres (FR)

(73) Assignee: Ceca S.A., Puteaux (FR)

( * ) Notice: Subject to any disclaimer, the term of this patent is extended or adjusted under 35 U.S.C. 154(b) by 470 days.

(21) Appl. No.: 10/583,670

(22) PCT Filed: Dec. 16, 2004

(86) PCT No.: PCT/EP2004/014911
§ 371 (c)(1),
(2), (4) Date: Dec. 26, 2007

(87) PCT Pub. No.: WO2005/061100
PCT Pub. Date: Jul. 7, 2005

(65) Prior Publication Data
US 2008/0156190 A1 Jul. 3, 2008

Related U.S. Application Data

(60) Provisional application No. 60/565,299, filed on Apr. 26, 2004.

(30) Foreign Application Priority Data

Dec. 22, 2003 (FR) .................................. 03 15123

(51) Int. Cl.
*B01J 20/18* (2006.01)
*B01D 53/04* (2006.01)

(52) U.S. Cl. ............... 95/129; 95/139; 95/143; 95/902; 423/239.2

(58) Field of Classification Search .............. 96/117, 96/121, 129, 139, 143, 148, 900, 902; 423/220, 423/239.2, 700, DIG. 21; 502/60, 64, 400, 407, 439

See application file for complete search history.

(56) References Cited

U.S. PATENT DOCUMENTS

| | | | | |
|---|---|---|---|---|
| 5,531,808 A * | 7/1996 | Ojo et al. | | 95/96 |
| 6,083,301 A * | 7/2000 | Gary et al. | | 95/130 |
| 6,183,539 B1 | 2/2001 | Rode et al. | | |
| 6,264,881 B1 * | 7/2001 | Plee | | 264/628 |
| 6,270,557 B1 * | 8/2001 | Millet et al. | | 95/96 |
| 6,391,092 B1 * | 5/2002 | Shen et al. | | 95/120 |
| 6,409,800 B1 * | 6/2002 | Ojo et al. | | 95/96 |
| 6,530,975 B2 * | 3/2003 | Rode et al. | | 95/117 |
| 6,537,348 B1 | 3/2003 | Hirano et al. | | |
| 6,596,256 B1 | 7/2003 | Ojo et al. | | |
| 6,616,732 B1 * | 9/2003 | Grandmougin et al. | | 95/96 |
| 6,824,588 B2 * | 11/2004 | Nakamura et al. | | 95/117 |
| 7,527,670 B2 * | 5/2009 | Ackley et al. | | 95/96 |
| 2001/0049998 A1 | 12/2001 | Tsybulevskiy et al. | | |
| 2003/0126989 A1 * | 7/2003 | Bancon et al. | | 95/96 |

FOREIGN PATENT DOCUMENTS

| | | |
|---|---|---|
| EP | 1 142 622 A | 10/2001 |
| EP | 1 184 338 A | 3/2002 |
| FR | 2 775 617 A | 9/1999 |
| WO | WO 00/01478 A | 1/2000 |
| WO | WO 01/24923 A | 4/2001 |

* cited by examiner

*Primary Examiner* — Frank M Lawrence
(74) *Attorney, Agent, or Firm* — Millen, White, Zelano & Branigan, P.C.

(57) ABSTRACT

The present invention relates to a novel method of purifying a gas stream contaminated by CO₂, hydrocarbons and/or nitrogen oxides, in particular a gas stream based on air or a syngas, by adsorption on a bed of aggregated zeolitic adsorbent based on an LSX zeolite or LSX and X zeolites, of which at least 90% of the exchangeable cationic sites of the LSX zeolite or of the LSX/X zeolite blend are occupied by sodium ions, and the inert binder of which represents at most 5% of the weight of the adsorbent.

15 Claims, 1 Drawing Sheet

Outlet

Adsorption Column

Inlet

Entry of the carrier gas/gas A mixture

US 7,935,177 B2

METHOD OF PURIFYING A GAS STREAM CONTAMINATED BY $CO_2$ AND ONE OR MORE HYDROCARBONS AND/OR NITROGEN OXIDES BY ADSORPTION ON AN AGGREGATED ZEOLITIC ADSORBENT

This application claims the benefit of the filing date of U.S. Provisional Application Ser. No. 60/565,299 filed on Apr. 26, 2004.

TECHNICAL FIELD

The field of the invention is that of the purification of gas streams by adsorption on zeolitic adsorbents. It relates more particularly to a method of purifying a gas stream containing, apart from the $CO_2$, at least one impurity chosen from the group formed by hydrocarbons and nitrogen oxides ($N_xO_y$) and possibly water.

PRIOR ART

The production of pure gases is an industrial operation carried out on a large scale and can involve either cryogenic processes or adsorption processes, or a combination of both these techniques; adsorption processes are in general based on passing the gas streams to be purified through a bed of adsorbent(s) using the principle of PSA (pressure swing adsorption), that of TSA (temperature swing adsorption) or a combination of both (PTSA or TEPSA (thermally enhanced pressure swing adsorption; see for example U.S. Pat. No. 5,614,000).

The construction of industrial units for producing ever greater quantities of pure gases, for example purified air before the step of separating $N_2$ and $O_2$, or else syngas purified before the separation of CO and $H_2$, requires the use of increasing quantities of adsorbents and increases the energy requirements intended to compensate for head losses. To improve the adsorptivity and to optimize the material transfer properties of the zeolites used in industrial adsorbers constitute in this regard a major economic challenge.

To eliminate carbon dioxide from a gas stream, for example for the purification of air, it is very general practice in industrial adsorption units to use a bed of adsorbent based on a faujasite-type zeolite having an Si/Al ratio of greater than or equal to 1.2, the exchangeable sites of which are sodium sites, such a zeolite also being called zeolite 13X. It has been known for some time that zeolite X is a better carbon dioxide adsorbent than silica gel or active carbon (U.S. Pat. No. 2,882,244). That patent also teaches that the selectivity with respect to various adsorbates varies with temperature and pressure.

U.S. Pat. No. 3,885,927 teaches that the adsorption of $CO_2$ may be effected on a zeolite X exchanged to more than 90% with barium: the $CO_2$ content of the gas to be purified does not exceed 1000 ppm and the temperature may be between −40° C. and 50° C.

EP 294 588 teaches the use of zeolite X preferably exchanged to 70% with strontium in order to carry out this purification.

U.S. Pat. No. 5,531,801 and EP 718 024 teach that it is possible to adsorb $CO_2$ very effectively by means of an X-type zeolite with an Si/Al ratio of less than 1.15 and preferably equal or very close to 1, called zeolite LSX (Low Silica X). The advantage compared with a conventional faujasite (Si/Al>1.2) lies in the fact that it is no longer necessary to reduce the temperature at the decarbonization step by means of a cold unit as the effectiveness of the zeolite is such that the selectivity for $CO_2$ compared with $N_2$ remains high, even at 50° C.

EP 1 062 022 shows that a very appreciable gain in efficiency may be obtained in respect of decarbonization at low $CO_2$ partial pressures (of around 2 mbar) using LSX zeolites whose degree of sodium exchange (defined as the molar ratio of sodium ions to aluminium atoms in the tetrahedral position, the remainder being potassium) is at least 98%.

WO 00/01478 describes NaKLSX adsorbents in which the Si/Al ratio is between 0.9 and 1.1, the $K^+$ ion content is less than 8%, the macroporous volume is greater than 0.4 cm³/g, containing small crystals (1-4 μm) that can be used for the decarbonization of gas streams. The document shows an increase in dynamic adsorptivity at room temperature in the case of low $CO_2$ partial pressures and an improvement in the kinetics and dynamics of PSA and TSA adsorbent beds thanks to the use of such molecular sieves. The authors attribute the increase in dynamic performance over a conventional NaKLSX adsorbent (i.e. one in which the zeolite is not in the form of small crystals) to the increase in macroporous volume conducive to rapid diffusion into the grain of adsorbent and to the ability of small crystals to reduce the resistance to surface diffusion compared with coarser crystals.

EP 1 218 099 proposes zeolitic adsorbents suitable for purifying gas streams contaminated by $CO_2$, based on a mixture of X and LSX zeolites, predominantly exchanged with sodium and strontium, aggregated with an optionally zeolitized binder.

EP 1 245 266 recommends the use of zeolite of type X or type A with an Si/Al ratio≧1.2 aggregated with a binder that is zeolitized; the authors have observed that zeolitization helps to increase the dynamic adsorptivity for $CO_2$ or $N_2O$ more than proportionally to the increase in active material (due to the zeolitization) and reduces the mass transfer region by at least 10 to 20%.

To preserve industrial equipment, for example cryogenic $N_2O_2$ separation units, it is a concern to remove, upstream of these units, apart from carbon dioxide and possibly water vapour, on the one hand nitrogen oxides (denoted hereafter as $N_xO_y$ with x ranging from 1 to 2 and y ranging from 1 to 4) that are liable to solidify in certain portions of the cold boxes and impede the proper operation thereof and/or on the other hand hydrocarbons, present in trace amounts (a few ppm), which may possibly concentrate at certain points and threaten the safe operation of industrial plants.

One solution consists in stopping the production of pure gas on a given adsorbent bed when one of the impurities of the $CO_2$, $N_xO_y$ or hydrocarbon type breaks through into the output. For example, when purifying air on a zeolite 13X used conventionally for decarbonization, the hydrocarbons and nitrogen oxides of course break through before $CO_2$, so that the adsorber is regenerated well before $CO_2$ breakthrough.

EP 930 089 discloses the elimination of $CO_2$ contained in a gas stream and possibly traces of water vapour and hydrocarbons by adsorption of these impurities on a zeolite X with an Si/Al ratio of between 1 and 1.5, containing 50 to 99% of $Ca^{2+}$ cations, at most 25% of $K^+$ cations and at least 1% of $Na^{2+}$ cations. The process is carried out at a temperature of between −40° C. and 80° C.

EP 995 477 discloses the elimination of $N_2O$ contained in a gas stream and possibly traces of water vapour, CO, $CO_2$, $H_2$ and/or hydrocarbons by adsorption of these impurities on a zeolite X having an Si/Al ratio of between 1 and 1.5 and containing at most 35% of $K^+$ cations, between 1 and 99% of $Na^+$ cations and between 1 and 99% of $Ca^{2+}$ cations, and preferably having at least 50% of $Ca^{2+}$. The process is carried out at a temperature between −40° C. and 80° C., preferably by TSA.

EP 1 064 978 A1 discloses the use of a zeolite of type X and LSX (Si/Al=1 to 1.4) exchanged to at least 30%, preferably to at least 75%, with barium and containing a cation of group IA or IIA for purifying air by the adsorption of $CO_2$ but also of impurities of the $C_3H_8$, $C_2H_4$ and $N_2O$ type. Such an adsorbent has the drawback of being more expensive than a conventional 13X-type adsorbent, even if it proves to be more effective.

FR 2 832 077 proposes an X-type adsorbent exchanged with calcium and with barium that is easier to manufacture and less expensive than a highly barium-exchanged zeolite X as described in EP 1 064 978, and also capable of purifying air by eliminating hydrocarbons such as ethylene, acetylene, butane and propane, and also nitrogen oxides $N_xO_y$, while removing the $CO_2$ and water vapour that are contained in the gas stream.

Other solutions have been proposed to purify air containing several impurities, including water vapour, carbon dioxide, nitrogen oxides $N_xO_y$, and/or traces of hydrocarbons consisting in using beds of multilayer adsorbents or composite adsorbents consisting of aggregated blends based on various zeolites.

EP 862 938 A1 discloses a PSA process for eliminating $CO_2$, water and $N_xO_y$, the adsorbent system of which is an alumina/zeolite bilayer, the zeolite possibly being of the Y, X or A type.

EP 992 274 A1 discloses a process for eliminating $CO_2$, water and $N_xO_y$ and possibly ethylene, the adsorbent system of which is a trilayer comprising, in succession, an adsorbent selective for water vapour, then an adsorbent selective for $CO_2$ (preferably 4A, 5A or 13X-based zeolite) and finally a third adsorbent selective for $N_xO_y$ and possibly for ethylene (preferably based on zeolite CaX BaX or binderless (with a low amount of binder) CaX).

EP 1 092 465 A2 discloses a TSA process for eliminating $CO_2$, water, $N_xO_y$ and/or hydrocarbons containing, in succession, an adsorbent selective for water vapour, then an adsorbent selective for $CO_2$ (preferably based on NaX or NaLSX zeolite) and finally a third adsorbent selective for $N_xO_y$ and/or for hydrocarbons (preferably based on CaX or CaLSX zeolite).

EP 904 823 A2 and U.S. Pat. No. 5,906,675 disclose a process for eliminating $CO_2$ which comprises a first bed of adsorbent capable of adsorbing water and at least 75% of the $CO_2$ (preferably alumina) operating in PSA mode and a second bed of adsorbent capable of adsorbing $CO_2$ (preferably NaLSX) operating in TSA mode.

EP 862 936 A2 discloses a PSA process for eliminating $CO_2$, water and $N_xO_y$, the adsorbent of which is an alumina/zeolite blend, it being possible for the zeolite to be of the Y, X, LSX or A type.

EP 1 101 521 A1 discloses a TSA process for eliminating $CO_2$, water and $N_xO_y$ and/or hydrocarbons, the adsorbent bed of which consists of a blend of an adsorbent for water and $CO_2$ (for example based on an NaX or NaLSX zeolite) and an adsorbent for $N_xO_y$ and/or hydrocarbons (for example based on a CaX or CaLSX zeolite).

SUMMARY OF THE INVENTION

The invention proposes a method of purifying a gas stream containing, as impurities, at least carbon dioxide, hydrocarbons and/or $N_xO_y$ and possibly water by adsorption on a aggregated zeolitic adsorbent; this method of purification proves to be particularly efficient as regards the elimination of all the abovementioned impurities. The dynamic $CO_2$ adsorptivity is high without being too penalized by premature breakthrough of hydrocarbons and/or $N_xO_y$, which does not require the use of multilayer beds or systems of composite beds (several adsorbents for the same bed). In addition, since the adsorbent used does not require exchange with barium or calcium cations, like the technical solutions proposed in EP 995 477 or EP 1 064 978, the method of purification according to the invention is particularly inexpensive.

The method of purifying a gas stream containing carbon dioxide and at least one impurity including hydrocarbons and nitrogen oxides, and possibly water, according to the invention consists in:

A—bringing the gas stream to be purified into contact with at least one adsorbent in aggregated form
either comprising at least 70%, preferably at least 80% and advantageously at least 85%, by weight of zeolite LSX, at least 90%, preferably at least 95% and advantageously at least 98% of the exchangeable sites of which are occupied by sodium ions, the rest of the cations possibly being, for example, potassium cations, up to 5% by weight of a binder that is inert as regards adsorption, and possibly up to 25%, preferably up to 20% and advantageously up to 15% of one or more other zeolites, such as zeolite X, zeolite A, etc. (type A aggregate adsorbent);
or comprising at least 70%, preferably at least 80% and advantageously at least 85%, by weight of a blend of at least 20% and preferably at least 30% of zeolite X and of at most 80%, preferably at least 70%, by weight of zeolite LSX, at least 90%, preferably at least 95% and advantageously at least 98% of the exchangeable sites of the said zeolites X and LSX of which are occupied by sodium ions, the rest of the cations possibly being, for example, potassium cations, up to 5% by weight of a binder that is inert to the adsorption, and possibly up to 25%, preferably up to 20% and advantageously up to 15% of one or more other zeolites, such as zeolite A, etc. (type B aggregate);

B—adsorbing at least some of the carbon dioxide, and at least some of the hydrocarbons and/or $N_xO_y$ on the said adsorbent;

C—desorbing the impurities adsorbed on the said adsorbent; and

D—regenerating the adsorbent.

The term "zeolite LSX" is understood to mean a zeolite of the X type (faujasite) having an Si/Al ratio of 1.00±0.02, preferably the crystals of which have a number-average diameter measured by SEM and counting, of less than or equal to 7 μm, preferably less than or equal to 4 μm, advantageously less than or equal to 3 μm and even more advantageously less than or equal to 2 μm.

The term "zeolite X" is understood to mean a zeolite of the X type (faujasite) having an Si/Al ratio of 1.25±0.05, preferably the crystals of which have a number-average diameter of less than or equal to 4 μm, preferably less than or equal to 3 μm and advantageously less than or equal to 2 μm.

The aggregated zeolites that can be used according to the invention may especially be in the form of beads, extrudates or strands, having in general a mean particle size between 0.2 and 5 mm.

A process for preparing type A or B zeolitic aggregates that can be used within the context of the invention comprises the following steps:

① aggregation of the precursor product, i.e. the LSX-type zeolite or a blend of zeolites LSX and X initially in the powder state, with a binder that can convert to a zeolite;

② drying at low temperature (around 80-100° C.) and calcination at a temperature between 300 and 700° C., preferably between 400 and 600° C., of the product obtained at ①;

③ zeolitization of the binder and simultaneous or consecutive, partial or complete, insertion into the zeolitic structure of Na$^+$ ions instead of the already present exchangeable cations (especially K$^+$) so as to have a final sodium exchange content of greater than or equal to 98%;

④ washing of the product obtained at ③; and

⑤ drying and activation at a temperature between 300 and 700° C., preferably between 400 and 600° C., preferably in a stream of dry decarbonated air, advantageously in a continuously traversed bed, of the product obtained at ④.

The binder that can convert to a zeolite may be chosen from clays that can be zeolitized, such as kaolin, metakaolin and halloysite, by themselves or as a blend.

In general, for 100 parts by weight of final aggregate according to the invention, 5 to 25, preferably 5 to 20, parts by weight of binder that can convert to a zeolite per 95 to 75 parts by weight of zeolite powder is used.

The zeolitization step ③ consists in converting all or part of the binder that can convert to a zeolite with which the LSX-type powder has been preblended by alkaline maceration, preferably according to the teaching of WO 99/05063 which is incorporated for reference.

A variant of step ① consists in conventionally blending an LSX-type powder with water and the binder that can convert to a zeolite and then in spraying this blend onto zeolitic aggregates already formed, which act as aggregation seeds. During this spraying operation, the aggregates may be continuously rotated about themselves using a "snowball"-type technique, for example in a reactor provided with a rotation shaft. The aggregates thus obtained are then in the form of beads.

One particularly preferred process for preparing B-type zeolitic aggregates that can be used within the context of the invention, which is described in EP 1 218 099 and U.S. Pat. No. 6,616,732, the contents of which are incorporated for reference, consists, prior to step ①, in carrying out a sodium exchange on the X and/or LSX powders before they are blended, or just after they are blended.

It would not be outside the scope of the invention to use A- or B-type zeolitic aggregates as defined above that would be prepared using a different preparation process, for example by direct aggregation of the zeolite LSX or zeolite X/LSX blend with the inert binder without a zeolitization step; in this case, the aggregates would be prepared with at most 5 parts by weight of binder per 95 parts by weight of zeolite LSX or zeolite X/LSX blend.

Likewise, it would not be outside the scope of the invention to use A- or B-type zeolitic aggregates as defined above which would be prepared exclusively from a aggregated binder that can convert to a zeolite and is then zeolitized as disclosed for example in U.S. Pat. No. 3,119,660, U.S. Pat. No. 4,603,040 and JP 05 163 015, the contents of which are incorporated for reference.

The gas stream purification method according to the invention may be carried out by passing the gas stream over one or more beds of A-type and/or B-type aggregated zeolitic adsorbent which are connected in parallel or capable of cyclically linking an adsorption step with a desorption step (intended for regenerating the adsorbent); in the industrial stage, this is preferably carried out using a pressure swing adsorption (PSA), temperature swing adsorption (TSA) or advantageously pressure temperature swing adsorption (PTSA or TEPSA) process. The PSA and PTSA or TEPSA processes involve the use of pressure cycles. In a first phase, the adsorbent bed separates the contaminant by adsorbing this constituent; in a second phase, the adsorbent is regenerated by lowering the pressure and/or by raising the temperature. At each new cycle, it is essential for the desorption of the contaminant to be as complete as possible and as effective as possible, so as to return to a regenerated adsorbent state identical or approximately identical at each new cycle.

The purification method according to the invention is particularly suitable for purifying air and for purifying a syngas.

For continuous purification of the gas stream, such as air or a syngas, a number of adsorbent beds are generally placed in parallel, these being subjected alternately to a cycle consisting of adsorption with compression and desorption with decompression. In PSA and PTSA processes, the treatment cycle to which each bed is subjected comprises the following steps:

a/ making the contaminated gas stream pass through an adsorption region comprising the adsorbent bed, the adsorbent bed separating the impurity or impurities by adsorption;

b/ desorbing the adsorbed impurities by establishing a pressure gradient and by progressively lowering pressure in the said adsorption region in order to recover the impurities via the inlet into the adsorption region; and c/ raising the pressure in the said adsorption region by introducing a flow of pure gas via the outlet of the adsorption region.

Thus, each bed is subjected to a treatment cycle comprising a pure (purified) gas production phase, a decompression second phase and a recompression third phase.

The adsorption region may comprise, beside an adsorbent bed described above, one or more other adsorbent beds capable of adsorbing the undesirable impurities or contaminants (multilayer system and/or blend of several adsorbents within the same layer). For example, to remove the water contained in air, it is possible to combine a dessicant to adsorb water, such as alumina or a silica gel, with the adsorbent of the present invention, either within the same bed or by the superposition of two beds.

To optimize the PSA and PTSA processes, the phases of decompressing and/or compressing the various adsorbent beds are preferably synchronized. It proves to be particularly advantageous to introduce steps for equalizing the pressures between two adsorbent beds, one being in decompression phase, the other in recompression phase. During implementation of the purification method according to the invention, using PSA or PTSA to purify air, the adsorption pressures are in general between 0.02 and 2 MPa and preferably between 0.11 and 1 MPa, whereas the desorption pressures are in general between 0.002 and 0.5 MPa and preferably between 0.01 and 0.2 MPa. As in the case of the air purification processes of the prior art, the temperatures in the adsorption region are in general between 0 and 80° C., advantageously between 20 and 60° C., and the desorption temperatures may in general be between 80 and 300° C., preferably between 150 and 250° C.

The amount of $CO_2$ present in the contaminated air gas stream is in general between 400 ppm and 0.7% by weight.

The amount of hydrocarbons present in the contaminated air gas stream does not in general exceed a few hundred ppm.

The amount of $N_xO_y$ present in the contaminated air gas stream does not in general exceed a few ppm.

The generic term "syngas" is used for gases consisting predominantly of hydrogen and CO (approximately 25% by volume of CO) that are used as reaction products in certain basic chemical syntheses (methanol, acetic acid, phosgene, acrylics, etc.). These syngases are generally obtained by a partial oxidation or steam or $CO_2$ reforming reaction carried out on a hydrocarbon feed (ranging from natural gas to heavy hydrocarbons) which gives a mixture comprising $H_2$+CO+ $CO_2$+$H_2O$+other impurities, the respective proportions of $H_2$, CO, $CO_2$ and $H_2O$ depending on the synthesis conditions.

The term "syngas" is also understood within the present invention to mean $H_2/N_2$ mixtures used especially for synthesizing ammonia. These mixtures are in general produced by partial oxidation of air or reforming of a hydrocarbon feed. This step may be supplemented with the so-called "CO shift" reaction, namely CO+$H_2O$→$CO_2$+$H_2$, which converts the CO into $CO_2$, and thus delivers more hydrogen.

It is often necessary to purify syngases, for example when it is desired to separate either CO and $H_2$, or $N_2$ and $H_2$, this being accomplished either cryogenically or by scrubbing with liquefied methane; it is absolutely necessary to eliminate all impurities that could crystallize and therefore block the exchangers used in the cryogenic process.

If the amount of $CO_2$ contained in the stream of syngas to be purified is greater than a few thousand ppm, it is general practice firstly to scrub with amines (of the MEA or MDEA type) in order to remove most of the $CO_2$. The syngas is then sent into a column of adsorbent(s) in order to remove the residual traces of $CO_2$ (a few tens of ppm) not removed by the amine scrubbing and possibly the other impurity or impurities present in the syngas, for example water often present at the same time as $CO_2$ (as a result of scrubbing with amines, the gas being saturated with water).

As a general rule, the adsorption region is maintained at a pressure between 0.5 and 7 MPa, while the gas mixture to be purified is being brought into contact with the adsorbent(s) described above. Although a higher pressure would not degrade the purification operation, for the sake of saving energy and because of the high cost of pressure-resistant plants, pressures above 7 MPa will in general, however, be avoided. Pressures below 0.5 MPa are not normally used for the industrial production of syngases for practical reasons since the processes involved upstream of the purification according to the invention, which correspond to syngas production reactions, are carried out at pressures generally of about 2-3 MPa. Preferably, the pressure obtaining in the adsorption region will be maintained at a value of less than or equal to 5 MPa, and advantageously less than or equal to 3 MPa. Likewise, the adsorption region is preferably maintained as greater than or equal to 0.5 MPa, and advantageously greater than or equal to 2 MPa.

The temperature of the gas stream entering the adsorption region is not a determining factor and it is generally kept constant throughout the adsorption phase. Ordinarily, this temperature is between 0 and 80° C., preferably between 20 and 60° C. The desorption temperature may be between 80 and 300° C., preferably between 150 and 250° C.

The amount of $CO_2$ present in the contaminated syngas stream is in general between 50 ppm and 0.7% by weight.

The amount of hydrocarbons present in the contaminated syngas stream does not in general exceed a few hundred ppm.

The amount of $N_xO_y$ present in the contaminated syngas stream does not in general exceed a few ppm.

The examples below, given by way of non-limiting illustration, demonstrate the advantage of such a method of purification.

The dynamic adsorption performance of the zeolitic adsorbent was evaluated by a conventional advancing-front chromatography test which consists in measuring, at the outlet of a column filled with aggregated adsorbents, the concentration response to a concentration step injected at the inlet of the column. FIG. 1 shows the principle of this step: a column of adsorbent is swept by a carrier gas. After time t=0, the gas to be tested, hereafter denoted by "gas A", is injected at a concentration $c_0$ at the inlet of the column. The concentration c of gas A at the outlet of the column is determined by an analyzer and recorded as a function of time. The curve c versus t, called the "breakthrough curve", forms an evaluation of the dynamic adsorptivity and the kinetic adsorption factors of the zeolitic adsorbent in respect of gas A. Two characteristic quantities, which for a person skilled in the art quantify the performance of the zeolitic adsorbent, are determined from the breakthrough curve:

firstly, the "breakthrough time", which corresponds to a concentration c at the outlet equal to a small percentage of the inlet concentration co, for example 5 ppm, and secondly, the "mass transfer zone", namely the estimated mean thickness of adsorbent which is neither devoid of adsorbed gas A nor saturated with gas A (intermediate region).

The breakthrough time is characteristic of the dynamic adsorptivity of the zeolitic adsorbent.

The mass transfer zone (MTZ) is an indicator of the diffusional properties and of the adsorption kinetics of the adsorbent and is calculated as follows:

$$MTZ = \frac{t_f - t_i}{t_s} \times H,$$

where $t_i$ is the time after which the concentration of gas A at the outlet is equal to a low percentage, for example 1 to 5%, of the inlet concentration $c_0$, $t_s$ is the time after which it is equal to $c_0/2$, $t_f$ is the time after which the concentration of gas A at the outlet is equal to a high percentage, for example 95 to 99%, of the inlet concentration $c_0$ and H is the zeolitic adsorbent fill height in the column.

A minimal transfer zone, i.e. a steep front, means that a given adsorbent bed can be operated with a maximum thickness of saturated adsorbent relative to the thickness of the bed, i.e. with maximum adsorptivity.

The steepness of the front opens the way to decreasing the bed thicknesses in TPSA plants and to their operation with shorter cycles while maintaining the same capability of producing pure gases.

BRIEF DESCRIPTION OF DRAWING

The attached drawing is a self-explanatory explanation of the above description of the mass transfer zone (MTZ).

The dynamic adsorption test is carried out in a column 29.7 mm in diameter with a fill height H of 42 cm. The carrier gas is nitrogen and this is injected at the base of the column with a volume flow rate of 2360 Sl/h. Gas A is carbon dioxide and is mixed with a carrier gas at time t=0 so as to be present in the stream at the inlet of the column with a concentration of 450 ppmv. The column is maintained at a pressure of 6 bar at a temperature of 25° C. The breakthrough time corresponds to a $CO_2$ concentration of 5 ppmv at the outlet of the column. The mass transfer zone MTZ is calculated using the formula indicated above, with times $t_i$ and $t_f$ taken for outlet concentrations equal to 5% and 95% of the inlet concentration, respectively.

Figure 1:
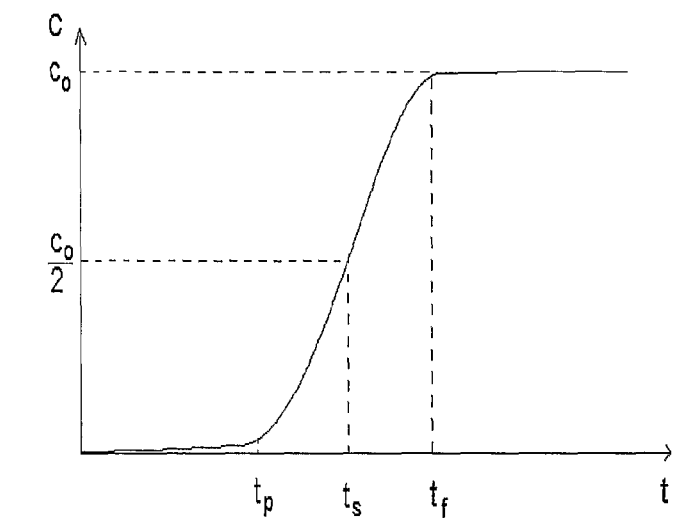
Figure 1:
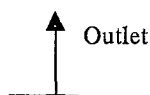
Figure 1:
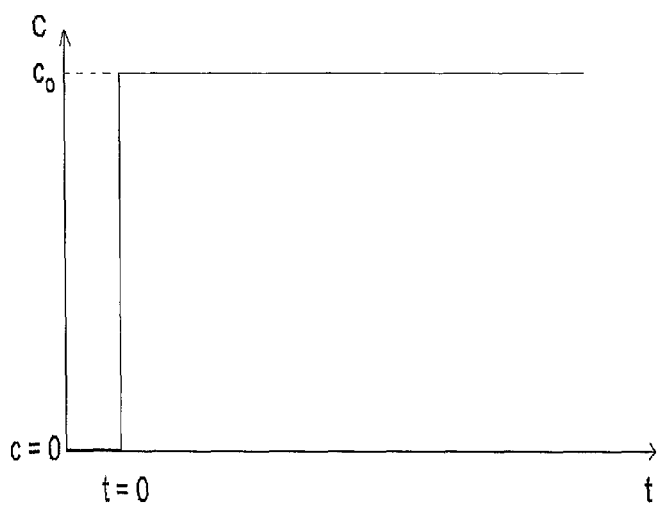

In all the examples, unless otherwise indicated, the proportions indicated are proportions by weight.

EXAMPLE 1

Adsorption of $CO_2$

The mass transfer zones for $CO_2$ and the breakthrough times for several zeolitic adsorbents prepared by aggregation of 85 parts by weight of zeolite X powder, LSX powder or an X/LSX powder blend with 15 parts by weight of a binder that can convert to a zeolite, of the kaolin type, whether subsequently zeolitized or not, were compared.

The zeolitization of the binder was carried out in accordance with the process indicated by the steps ① to ⑤ detailed above (the activation temperature in step ⑤ being about 580° C.). After zeolitization, the aggregates with zeolitized binder contained a maximum of 5% by weight of inert material measured by conventional methods such as the Dubinin volume and the toluene adsorption index (toluene adsorptivity at a relative pressure of 0.5 at 25° C.).

Table 1 combines the results for 10 zeolitic adsorbents tested, which were in the form of beads with an average particle size between 1.6 and 2.5 mm and a volume-average diameter of 2 mm.

TABLE 1

| Zeolitic aggregate tested | Relative $CO_2$ breakthrough time at 5 ppmv/active material | MTZ (cm) | $CO_2$ relative dynamic adsorptivity |
|---|---|---|---|
| 13X with 15% binder (comparative) | 1.00 | 14.5 | 1.00 |
| CaX with 15% binder (55% $Ca^{2+}$) (comparative) | 1.00 | 13.6 | 1.11 |
| CaX with 15% binder (70% $Ca^{2+}$) (comparative) | 1.06 | 15.3 | 1.25 |
| CaBaX (23% $Ca^{2+}$; 37% $Ba^{2+}$) with zeolitized binder (comparative) | 1.35 | 9.2 | 1.35 |
| 13X zeolitized binder (comparative) | 1.54 | 8.9 | 1.46 |
| (70% 13X + 30% NaLSX) with 15% binder (96% $Na^+$) (comparative) | 1.58 | 10.7 | 1.46 |
| (70% 13X + 30% NaLSX) with zeolitized binder (98% $Na^+$) (according to the invention) | 2.10 | 8.5 | 1.79 |
| NaLSX with 15% binder (99% $Na^+$) (comparative) | 2.16 | 12.9 | 2.30 |
| NaLSX with zeolitized binder (92% $Na^+$) (according to the invention) | 2.54 | 10.5 | 2.50 |
| NaLSX with zeolitized binder (99% $Na^+$) (according to the invention) | 3.02 | 8.7 | 2.84 |

Table 1 illustrates and clearly confirms the advantage in using the aggregates according to the invention compared with conventional 13X zeolite aggregates (with 15% binder) (+110 to +102% increase in the breakthrough time) or 13X aggregates with zeolitized binder (+36% to 96% increase in the breakthrough time).

It may also be seen that replacing a conventional aggregated 13X sieve with 15% binder by the aggregates according to the invention allows the dynamic adsorptivity to be increased by 79 to 184%.

The above tests are repeated on 10 zeolitic adsorbents having the same compositions but for which the activation temperature is about 450° C. The results are combined in Table 1 bis.

TABLE 1 bis

| Zeolitic aggregate tested | Relative $CO_2$ breakthrough time at 5 ppmv/active material | MTZ (cm) | $CO_2$ relative dynamic adsorptivity |
|---|---|---|---|
| 13X with 15% binder (comparative) | 1.00 | 13.2 | 1.00 |
| CaX with 15% binder (55% $Ca^{2+}$) (comparative) | 0.8 | 13.6 | 0.87 |
| CaX with 15% binder (70% $Ca^{2+}$) (comparative) | 0.85 | 15.3 | 0.94 |

TABLE 1-continued bis

| Zeolitic aggregate tested | Relative $CO_2$ breakthrough time at 5 ppmv/active material | MTZ (cm) | $CO_2$ relative dynamic adsorptivity |
|---|---|---|---|
| CaBaX (23% $Ca^{2+}$; 37% $Ba^{2+}$) with zeolitized binder (comparative) | 1.41 | 10.9 | 1.26 |
| 13X zeolitized binder (comparative) | 1.36 | 8.2 | 1.17 |
| (70% 13X + 30% NaLSX) with 15% binder (96% $Na^+$) (comparative) | 1.29 | 13.2 | 1.32 |
| (70% 13X + 30% NaLSX) with zeolitized binder (98% $Na^+$) (according to the invention) | 1.7 | 7 | 1.56 |
| NaLSX with 15% binder (99% $Na^+$) (comparative) | 1.96 | 11 | 2.03 |
| NaLSX with zeolitized binder (92% $Na^+$) (according to the invention) | 2.08 | 9.9 | 2.11 |
| NaLSX with zeolitized binder (99% $Na^+$) (according to the invention) | 2.48 | 8.1 | 2.31 |

EXAMPLE 2

Adsorption of $N_2O$

Nitrous oxide adsorption isotherms were determined at 25° C. by a conventional volumetric system suitable for low pressure. Table 2 shows the relative Henry constants for these isotherms.

TABLE 2

| Zeolitic aggregate tested | K ($N_2O$) |
|---|---|
| 13X with 15% binder (comparative) | 1.00 |
| Ca X with 15% binder (70% $Ca^{2+}$) (comparative) | 0.82 |
| CaBaX (23% $Ca^{2+}$; 37% $Ba^{2+}$) with zeolitized binder (comparative) | 1.70 |
| 13X with zeolitized binder(comparative) | 1.37 |
| (70% 13X + 30% NaLSX) with zeolitized binder(98% $Na^+$) (according to the invention) | 1.13 |
| NaLSX with 15% binder (99% $Na^+$) (comparative) | 1.31 |
| NaLSX with zeolitized binder (92% $Na^+$) (according to the invention) | 1.51 |
| NaLSX with zeolitized binder (99% $Na^+$) (according to the invention) | 1.92 |

As in the case of $CO_2$ adsorption, it may be seen that there is an advantage in replacing a conventional 13X sieve with the aggregates according to the invention.

EXAMPLE 3

Adsorption of Ethylene

Ethylene adsorption isotherms were similarly determined at 25° C. Table 3 shows the relative amounts adsorbed by the various sieves under a pressure of 3 mbar.

TABLE 3

| Zeolitic aggregate tested | $C_2H_4$ relative adsorptivity |
|---|---|
| 13X with 15% binder (comparative) | 1.00 |
| CaX with 15% binder (70% $Ca^{2+}$) (comparative) | 1.89 |
| 13X with zeolitized binder(comparative) | 2.03 |
| (70% 13X + 30% NaLSX) with 15% binder (96% $Na^+$) (comparative) | 1.56 |
| (70% 13X + 30% NaLSX) with zeolitized binder | 1.98 |

TABLE 3-continued

| Zeolitic aggregate tested | $C_2H_4$ relative adsorptivity |
|---|---|
| (98% $Na^+$) (according to the invention) | |
| NaLSX with 15% non-zeolitized binder (99% $Na^+$) (comparative) | 1.98 |
| NaLSX with zeolitized binder (92% $Na^+$) (according to the invention) | 1.42 |
| NaLSX with zeolitized binder (99% $Na^+$) (according to the invention) | 2.31 |

It may be seen that most of the aggregated zeolites according to the invention exhibit the highest ethylene adsorptivities.

EXAMPLE 4

Effect of Zeolite Crystal Size (Adsorption of $CO_2$)

The particle size of the zeolite LSX and X powders used was determined by means of a commercial apparatus from Malvern, based on light scattering. The number-average diameters calculated by the operating software are given in the 2nd column of Table 4 and highlight the effect of the size of the crystals used for the aggregation. Table 4 repeats and supplements the results of Table 1, indicating the average diameter of the zeolite powders used for preparing the aggregates and supplements it with results obtained using crystals of smaller particle size than those of Examples 1 to 3, in which the number-average diameter of the zeolite LSX crystals is 6.5 µm and those of the zeolite X crystals is 2.3 µm (also activated at about 580° C.)

TABLE 4

| Zeolitic aggregate tested | Number-average diameter of the powder (µm) | Relative breakthrough time at 5 ppmv | MTZ (cm) |
|---|---|---|---|
| 13 X with 15% binder | 2.3 | 1.00 | 14.5 |
| 13 X with zeolitized binder | 2.3 | 1.54 | 8.9 |
| 13 X with 15% binder | 1.8 | 0.89 | 11.5 |
| 13 X with zeolitized binder | 1.8 | 1.72 | 7.4 |
| NaLSX with 15% binder (99% $Na^+$) | 6.5 | 2.16 | 12.9 |
| NaLSX with zeolitized binder | 6.5 | 2.54 | 10.5 |

TABLE 4-continued

| Zeolitic aggregate tested | Number-average diameter of the powder (μm) | Relative breakthrough time at 5 ppmv | MTZ (cm) |
|---|---|---|---|
| (92% Na$^+$) NaLSX with zeolitized binder (99% Na$^+$) | 6.5 | 3.02 | 8.7 |
| NaLSX with 15% binder (99% Na$^+$) | 3.5 | 1.9 | 9.5 |
| NaLSX with zeolitized binder (99% Na$^+$) | 3.5 | 3.4 | 6.7 |

Table 4 clearly shows the consequences of reducing the crystal size of the aggregates according to the invention.

Aggregates made up of small crystals are markedly more advantageous than their equivalents made up of coarser crystals, both in terms of relative breakthrough time and in mass transfer zone, something which is unexpected and makes the small-crystal aggregates according to the invention particularly attractive for decarbonization.

Table 4 bis repeats and supplements the results of Table 1bis, indicating the average diameter of the zeolite powders used for preparing the aggregates and supplements it with results obtained using crystals of smaller particle size than those of Examples 1 to 3, in which the number-average diameter of the zeolite LSX crystals is 6.5 μm and those of the zeolite X crystals is 2.3 μm (also activated at about 450° C.)

TABLE 4 bis

| Zeolitic aggregate tested | Number-average diameter of the powder (μm) | Relative breakthrough time at 5 ppmv | MTZ (cm) |
|---|---|---|---|
| 13 X with 15% binder | 2.3 | 1.00 | 13.2 |
| 13 X with zeolitized binder | 2.3 | 1.36 | 8.2 |
| 13 X with 15% binder | 1.8 | 0.98 | 9.7 |
| 13 X with zeolitized binder | 1.8 | 1.48 | 8.5 |
| NaLSX with 15% binder (99% Na$^+$) | 6.5 | 1.96 | 11 |
| NaLSX with zeolitized binder (92% Na$^+$) | 6.5 | 2.08 | 9.9 |
| NaLSX with zeolitized binder (99% Na$^+$) | 6.5 | 2.48 | 8.1 |
| NaLSX with 15% binder (99% Na$^+$) | 3.5 | 1.8 | 9 |
| NaLSX with zeolitized binder (99% Na$^+$) | 3.5 | 3 | 6.7 |

The invention claimed is:

1. A method of purifying a gas stream from both carbon dioxide and at least one other impurity chosen from among hydrocarbons and nitrogen oxides, said method comprising:

A—bringing the gas stream to be purified into contact with at least one adsorbent in aggregated form
either comprising at least 85% by weight of zeolite LSX having at least 90% of the exchangeable sites occupied by sodium ions, and the rest of the cations optionally being-potassium and up to 5% by weight of a binder that is inert to the adsorption, or 5-25 parts by weight of a zeolitized clay binder per 100 parts of final aggregate (type A aggregate);

or comprising at least 70%, by weight of a blend of at least 20% of zeolite X and of at most 80%, by weight of zeolite LSX, said blend having at least 90%, of the exchangeable sites of the said zeolites X and LSX of which are occupied by sodium ions, the rest of the cations optionally being, potassium cations, and up to 5% by weight of a binder that is inert to the adsorption or 5-25 parts by weight of a zeolitized clay binder per 100 parts of final aggregate and optionally up to 25% of one or more other zeolites (type B aggregate); and wherein the number average size of zeolite LSX crystals in aggregate A and aggregate B is less than 4 microns;

B—adsorbing at least some of the carbon dioxide, and at least some of the hydrocarbons and/or $N_xO_y$ on the said adsorbent;

C—desorbing the impurities adsorbed on the said adsorbent; and

D—regenerating the adsorbent.

2. A method according to claim 1, characterized in that the gas stream to be purified comprises air.

3. A method according to claim 1, characterized in that the gas stream to be purified comprises syngas.

4. A method according to claim 1, the adsorbent comprises at least one bed comprising a blend of several adsorbents including adsorbent type B.

5. A method according to claim 1, wherein the adsorbent comprises a binder which is a zeolitized clay in a concentration of 5-25 parts by weight.

6. A method according to claim 5, wherein the adsorbent comprises a type A aggregate.

7. A method according to claim 5, wherein the adsorbent comprises a type B aggregate.

8. A method according to claim 6, wherein at least 98% of the exchangeable sites in the zeolite LSX are occupied by sodium ions.

9. A method according to claim 7, wherein at least 98% of the exchangeable sites in zeolites X and LSX are occupied by sodium ions.

10. A method according to claim 9, wherein the blend comprises at least 30% and at most 80% zeolite X.

11. A method according to claim 1, wherein the binder is inert to adsorption.

12. A method according to claim 1, wherein said adsorbing step B removes carbon dioxide, to the extent that the concentration leaving the adsorbent constitutes about 1-5% of the initial concentration in the gas stream being adsorbed.

13. A method according to claim 12, characterized in that the gas stream to be purified comprises air.

14. A method according to claim 12, characterized in that the gas stream to be purified comprises syngas.

15. A method according to claim 6 characterized in that a PSA, TSA, TPSA or TEPSA-type process is carried out.

* * * * *